United States Patent
Shin et al.

(10) Patent No.: US 12,262,330 B2
(45) Date of Patent: Mar. 25, 2025

(54) APPARATUS AND METHOD FOR CONTROLLING TRANSMISSION POWER BASED ON REINFORCEMENT LEARNING

(71) Applicant: Samsung Electronics Co., Ltd., Suwon-si (KR)

(72) Inventors: Ukhyeon Shin, Suwon-si (KR); Kwonyeol Park, Jeonju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 365 days.

(21) Appl. No.: 17/842,211

(22) Filed: Jun. 16, 2022

(65) Prior Publication Data

US 2022/0408375 A1 Dec. 22, 2022

(30) Foreign Application Priority Data

Jun. 22, 2021 (KR) .......................... 10-2021-0081038

(51) Int. Cl.
*H04W 52/34* (2009.01)
*H04W 52/24* (2009.01)

(52) U.S. Cl.
CPC ....... *H04W 52/346* (2013.01); *H04W 52/241* (2013.01); *H04W 52/242* (2013.01)

(58) Field of Classification Search
CPC ............. H04W 52/241; H04W 52/242; H04W 52/346; H04W 52/367; Y02D 30/70
See application file for complete search history.

(56) References Cited

U.S. PATENT DOCUMENTS

| | | | |
|---|---|---|---|
| 8,798,664 B2 | 8/2014 | Yun | |
| 9,603,105 B2 | 3/2017 | Yun | |
| 10,004,048 B2 | 6/2018 | Komulainen et al. | |
| 10,686,538 B2 | 6/2020 | Seyed et al. | |
| 10,826,550 B2 | 11/2020 | Choi et al. | |
| 10,924,145 B2 | 2/2021 | Mercer et al. | |
| 2018/0175944 A1* | 6/2018 | Seyed | H04B 1/3833 |
| 2020/0142057 A1 | 5/2020 | Pendse et al. | |
| 2020/0267662 A1* | 8/2020 | Godala | H04W 52/367 |
| 2020/0412459 A1 | 12/2020 | Seyed et al. | |
| 2021/0051465 A1 | 2/2021 | Koshy et al. | |
| 2021/0055385 A1* | 2/2021 | Rimini | G01S 7/417 |
| 2021/0067189 A1* | 3/2021 | Yu | H04W 52/367 |
| 2022/0217645 A1* | 7/2022 | Gupta | H04W 52/146 |

FOREIGN PATENT DOCUMENTS

| | | |
|---|---|---|
| KR | 10-1722237 B1 | 3/2017 |
| WO | WO-2012-122116 A1 | 9/2012 |

* cited by examiner

*Primary Examiner* — Nguyen T Vo
(74) *Attorney, Agent, or Firm* — Harness, Dickey & Pierce, P.L.C.

(57) ABSTRACT

A method of controlling transmission power for wireless communication includes obtaining detected transmission power; generating a state variable and a reward variable of a reinforcement learning model based on the detected transmission power, threshold transmission power, and a channel state; and training a reinforced learning agent based on the state variable and the reward variable to output an action variable of the reinforcement learning model representing the transmission power.

18 Claims, 10 Drawing Sheets

APPARATUS AND METHOD FOR CONTROLLING TRANSMISSION POWER BASED ON REINFORCEMENT LEARNING

CROSS-REFERENCE TO RELATED APPLICATION

This application is based on and claims priority under 35 U.S.C. § 119 to Korean Patent Application No. 10-2021-0081038, filed on Jun. 22, 2021, in the Korean Intellectual Property Office, the disclosure of which is incorporated by reference herein in its entirety.

BACKGROUND

The inventive concepts relate to wireless communication, and more particularly, to an apparatus and a method for controlling transmission power based on reinforced learning.

Signal transmission in a wireless communication system may be susceptible to path loss, shadow fading, etc., and thus, additional power (e.g., transmission power) may be demanded to ensure that quality of service (QoS) is not degraded. For example, high transmission power may be required for wireless communication using a signal in a high frequency band that is easily attenuated, such as a millimeter wave (mmWave). However, high-density electromagnetic waves may be generated as the transmission power increases. Therefore, it may be important to limit the energy absorbed by a user of a wireless communication device by electromagnetic waves while minimizing and/or reducing the deterioration of communication quality.

SUMMARY

The inventive concepts provide an apparatus and a method for effectively reducing a user's exposure to electromagnetic waves while maintaining the quality of wireless communication.

According to an aspect of the inventive concepts, there is provided a method of controlling transmission power for wireless communication, the method including obtaining detected transmission power; generating a state variable and a reward variable based on the detected transmission power, a threshold transmission power, and a channel state; and training a reinforced learning agent based on the state variable and the reward variable to output an action variable representing the transmission power.

According to another aspect of the inventive concepts, there is provided an apparatus including a memory configured to store instructions; and at least one processor configured to communicate with the memory and, by executing the instructions, control transmission power for wireless communication wherein, to control the transmission power, the at least one processor is configured to obtain detected transmission power; generate a state variable and a reward variable based on the detected transmission power, a threshold transmission power, and a channel state; and train a reinforced learning agent based on the state variable and the reward variable to output an action variable representing the transmission power.

According to another aspect of the inventive concepts, there is provided a method of controlling transmission power for wireless communication, the method including obtaining detected transmission power; and training a reinforced learning agent based on the detected transmission power, a threshold transmission power, and a channel state to output an action variable representing the transmission power, wherein the training of the reinforced learning agent includes setting a range of transmission power based on transmission power of a previous unit period; calculating a plurality of Q-values of Q-learning respectively corresponding to a plurality of transmission power candidates included in the range of transmission power; selecting one transmission power candidate from among the plurality of transmission power candidates based on the plurality Q-values; and generating the action variable and updating a Q-table based on the selected transmission power candidate.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION OF THE EMBODIMENTS

Figure 1:
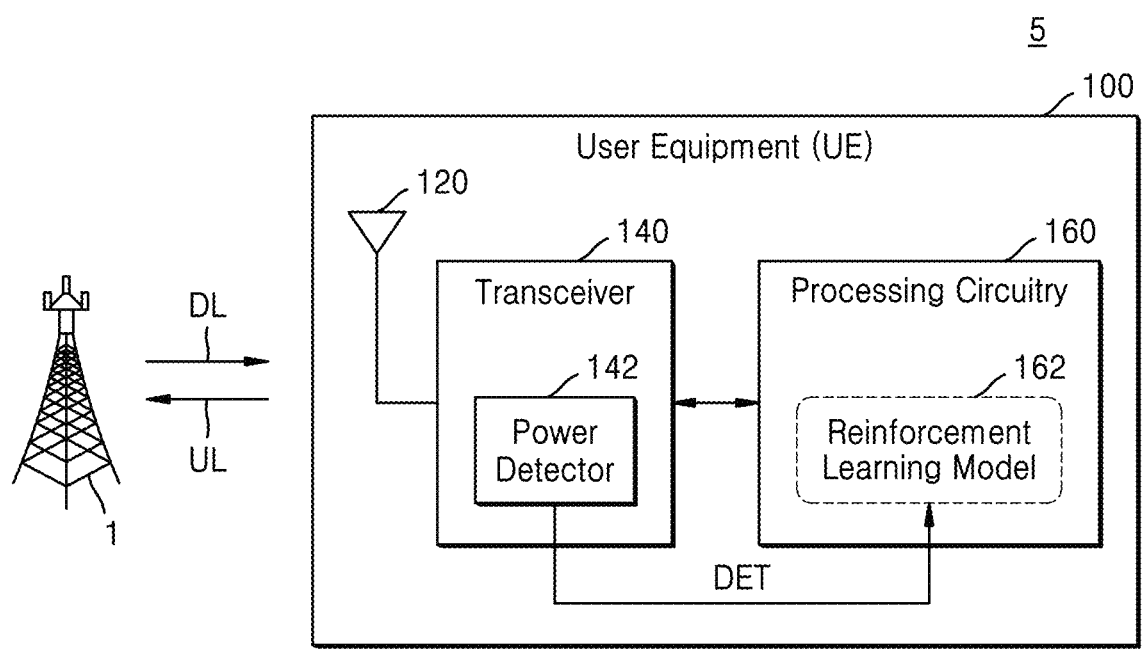
FIG. 1 is a block diagram showing a wireless communication system according to some example embodiments.

Hereinafter, some example embodiments of the technical idea of the inventive concepts will be described in detail with reference to the accompanying drawings. The same reference numerals are used for the same components in the drawings, and repeated descriptions thereof are omitted.

FIG. 1 is a block diagram showing a wireless communication system 5 according to some example embodiments. The wireless communication system 5 may include, for example, a wireless communication system using a cellular network (such as a 5th Generation Wireless (5G) New Radio (NR) system, a Long Term Evolution (LTE) system, an LTE-Advanced system, a Code Division Multiple Access (CDMA) system, a Global System for Mobile Communications (GSM) system, a Wireless Personal Area Network (WPAN) system, and/or the like). Hereinafter, a wireless communication system 5 will be described with reference mainly to a wireless communication system using a 5G NR as a cellular network, but it will be understood that the example embodiments are not limited thereto.

A base station (BS) 1 may generally refer to a fixed station that communicates with a user equipment (UE) and/or other base stations. The base station 1 may, for example, exchange data and control information with the UE and/or the other base stations by communicating with the UE and/or the other base stations. In some example embodiments, the BS 1 may be referred to as a Node B, an evolved-Node B (eNB), a next generation Node B (gNB), a sector, a site, a base transceiver system (BTS), an access point (AP), a relay node, a remote radio head (RRH), a radio unit (RU), a small cell, etc. Herein, a BS or a cell may be understood as a comprehensive term indicating a portion and/or a function covered by a base station controller (BSC) in the CDMA, a Node-B in the WCDMA, an eNB in the LTE, a gNB in the 5G, and/or a sector (site); and may include various coverage areas like a megacell, a macrocell, a microcell, a picocell, a femtocell a relay node, an RRH, an RU, and/or a small cell communication range.

The UE 100 may refer to equipment that is stationary and/or mobile and which may communicate with a base station (e.g., the BS 1), to transmit and/or receive data and/or control information. For example, the UE 100 may be referred to as a terminal, a terminal equipment, a mobile station (MS), a mobile terminal (MT), a user terminal (UT), a subscriber station, a wireless device, a handheld device, etc. Hereinafter, example embodiments will be described primarily with reference to the UE 100 as a wireless communication device, but it will be understood that the example embodiments are not limited thereto.

A wireless communication network between the UE 100 and the BS 1 may support communication by multiple users by sharing available network resources. For example, in a wireless communication network, information may be transmitted in various multiple access schemes (such as code division multiple access (CDMA), frequency division multiple access (FDMA), time division multiple access (TDMA), orthogonal frequency division multiple access (OFDMA), single carrier frequency division multiple access (SC-FDMA), OFDM-FDMA, n OFDM-TDMA, OFDM-CDMA, and/or the like). As shown in FIG. 1, the UE 100 may communicate with the BS 1 through an uplink UL and a downlink DL. In some embodiments, UEs may communicate with each other through a sidelink (e.g., device-to-device (D2D)) (not shown).

The UE 100 may include an antenna 120, a transceiver 140, and processing circuitry 160, as shown in FIG. 1. In some embodiments, the antenna 120, the transceiver 140, and the processing circuitry 160 may be apart from one another and individually packaged. In some embodiments, at least two of the antenna 120, the transceiver 140, and/or the processing circuitry 160 may be packaged in common.

The antenna 120 may receive a signal transmitted by the BS 1 and/or may output a signal to be transmitted to the BS 1. In some embodiments, the antenna 120 may be and/or include an antenna array including a plurality of antennas (e.g., for multiple-input multiple-output (MIMO)). In some embodiments, the antenna 120 may include a phased array for beam forming.

The transceiver 140 may process a signal received through the antenna 120 and/or a signal to be transmitted through the antenna 120. For example, the transceiver 140 may include at least one RX path for processing respective radio frequency (RF) signals received through the antenna 120 in a reception mode and at least one TX path for generating respective RF signals to be transmitted through the antenna 120 in a transmission mode. In some embodiments, an RX path may include a low noise amplifier (LNA), a filter, a mixer, etc., whereas a TX path may include a power amplifier (PA), a filter, a mixer, etc. As shown in FIG. 1, the transceiver 140 may include a power detector 142.

The power detector 142 may detect (and/or measure) the power (e.g., transmission power) of a signal output from the transceiver 140 to the antenna 120. For example, the power detector 142 may detect transmission power by detecting the power of a signal fed back through an RX path not used in the transmission mode. As shown in FIG. 1, the power detector 142 may provide a detection signal DET indicating detected transmission power $P_{DET}$ to the processing circuitry 160. In some embodiments, the power detector 142 may be a radio frequency (RF) power detector and/or the like.

In a high frequency band like a millimeter wave (mm-Wave) band, a short-wavelength signal may have a strong straightness, and thus, the quality of communication may depend conditions of on the path of the uplink UL (and/or downlink DL). For example, the quality may be affected by interruption (e.g., by an obstacle) and/or by the orientation of an antenna. Therefore, in some wireless communication systems using a high frequency band for increasing throughput, a transmitter may compensate by using high transmission power. Also, when the antenna 120 includes a plurality of antennas for beam forming, spatial diversity, polarization diversity, spatial multiplexer, etc., and/or the UE 100 supports simultaneous access to two or more wireless communication systems (e.g., dual connectivity) total radiated power (TRP) output from the UE 100 may increase. Therefore, a user of the UE 100 may be exposed to high-density electromagnetic waves during, e.g., an uplink UL transmission.

Metrics like a specific absorption rate (SAR) and a maximum permissible exposure (MPE) may be used to define a save limit for the energy absorbed by a human body due to electromagnetic waves, and organizations like the Federal Communications and Commissions (FCC) of the United States of America may regulate the upper limits of values that wireless communication devices have to comply with. For example, an upper limit of energy measured from the UE 100 (e.g., for a certain measurement period) may be set, and the measurement period may vary according to, e.g., the frequency band. Therefore, the UE 100 may limit an average of the output energy during a measurement period, even when it is allowed to use high transmission power for a short period. Hereinafter, some example embodiments will be mainly described with reference to the SAR of electromagnetic waves, and the values that the UE 100 has to comply with will be referred to as SAR conditions.

The processing circuitry 160 may extract information provided by the BS 1 from a signal received from the transceiver 140 in the reception mode. For example, the processing circuitry may be configured to extract information from a payload of the BS 1. The processing circuitry 160 may also provide information to be transmitted to the BS 1 in the transmission mode, e.g., a signal including a payload of the UE 100, to the transceiver 140. In some embodiments, the processing circuitry 160 may include and/or be included in hardware including logic circuits; a hardware/software combination such as a processor executing software; or a combination thereof. For example, the processing circuitry may include, and/or be included in, at least one of programmable components like a central processing unit (CPU) and a digital signal processor (DSP), reconfigurable components like a field programmable gate array (FPGA), and/or components that provide fixed functions like an intelligent property (IP) core. In some embodiments, the processing circuitry 160 may be referred to as a communication processor, a baseband processor, a modem, etc.

In some embodiments, the processing circuitry 160 may control transmission power based on reinforced learning. For example, as shown in FIG. 1, the processing circuitry 160 may implement a reinforcement learning model 162. A reinforcement learning model may be model-free machine learning, and, as described below with reference to FIG. 3, in the reinforcement learning model, an agent may be trained to perform an action to increase and/or maximize a reward in an environment. The reinforcement learning model may be, for example, included in a processor memory (not shown) included in and/or associated with the processing circuitry 160.

In some embodiments, an optimal transmission power to comply with the SAR conditions and provide desired communication quality may be derived by the reinforcement learning model 162. To this end, the reinforcement learning model 162 may derive the transmission power of a unit period based on the detected transmission power $P_{DET}$, the SAR conditions, and/or a channel state. Therefore, a user's exposure to electromagnetic waves may be effectively reduced while reducing and/or minimizing the potential degradation of wireless communication quality. Also, in spite of variations of wireless communication devices, transmission power efficiency may be improved and/or optimized for each wireless communication device based on individual reinforced learning.

Figure 2:
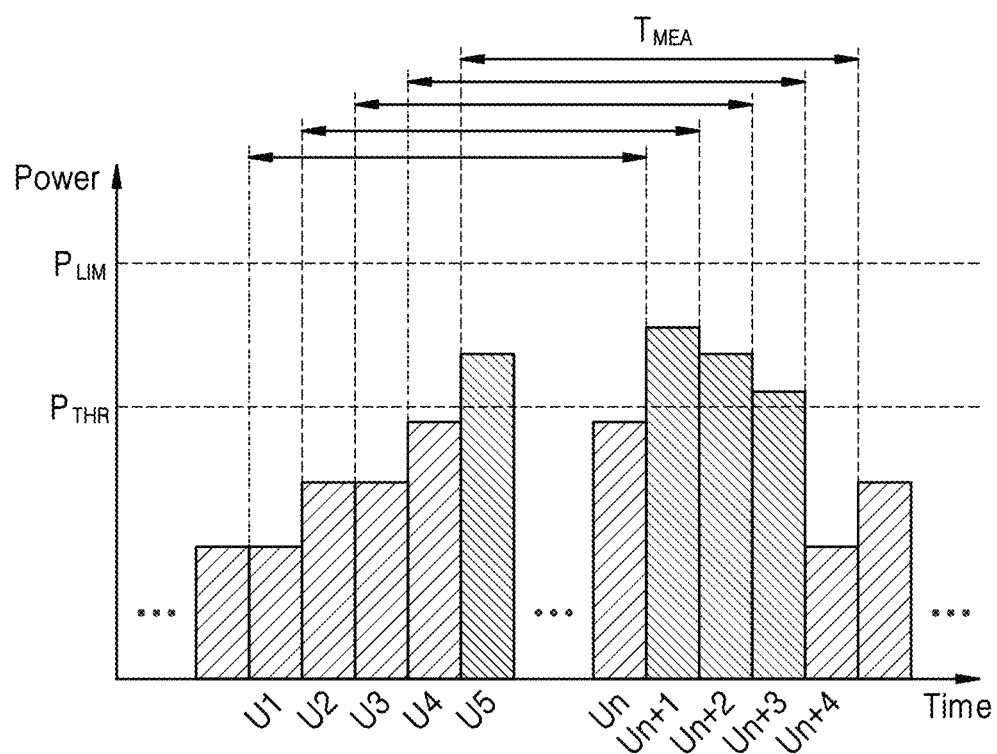
FIG. 2 is a graph showing an example of transmission power according to lapse of time.

FIG. 2 is a graph showing an example of transmission power according to lapse of time. As described above with reference to FIG. 1, SAR requirements may limit the amount of transmission power during a measurement period $T_{MEA}$.

In some embodiments, the transmission power may be controlled in each unit period within the maximum transmission power $P_{LIM}$. For example, as shown in FIG. 2, the measurement period $T_{MEA}$ may include n unit periods, and the n unit periods may have the same transmission power and/or different transmission power within the maximum transmission power $P_{LIM}$ (wherein n represents an integer greater than 1). When the total transmission power allowed during the measurement period $T_{MEA}$ according to SAR conditions is $S_t$, threshold transmission power $P_{THR}$ may be defined as shown in [Equation 1] below.

$$P_{THR} = \frac{S_L}{n} \quad \text{[Equation 1]}$$

The total transmission power during n consecutive unit periods may be required to satisfy the SAR conditions, and thus, an average of n pieces of transmission power respectively corresponding to the n unit periods may be less than or equal to the threshold transmission power $P_{THR}$.

For example, in some embodiments, the transmission power of a unit period may be controlled based on the threshold transmission power $P_{THR}$. For example, when unit periods (e.g., U1, U2, U3, etc.) each having transmission power less than the threshold transmission power $P_{THR}$ are consecutive, the margin of transmission power in unit periods following the corresponding unit periods may increase. On the other hand, when unit periods (e.g., U5, Un+1, Un+2, Un+3, etc.) each having transmission power greater than the threshold transmission power $P_{THR}$ are consecutive, the margin of transmission power in unit periods following the corresponding unit periods may decrease. Hereinafter, with reference to the drawings, examples of the operation of determining the optimal transmission power in a unit period based on a reinforcement learning model will be described.

Figure 3:
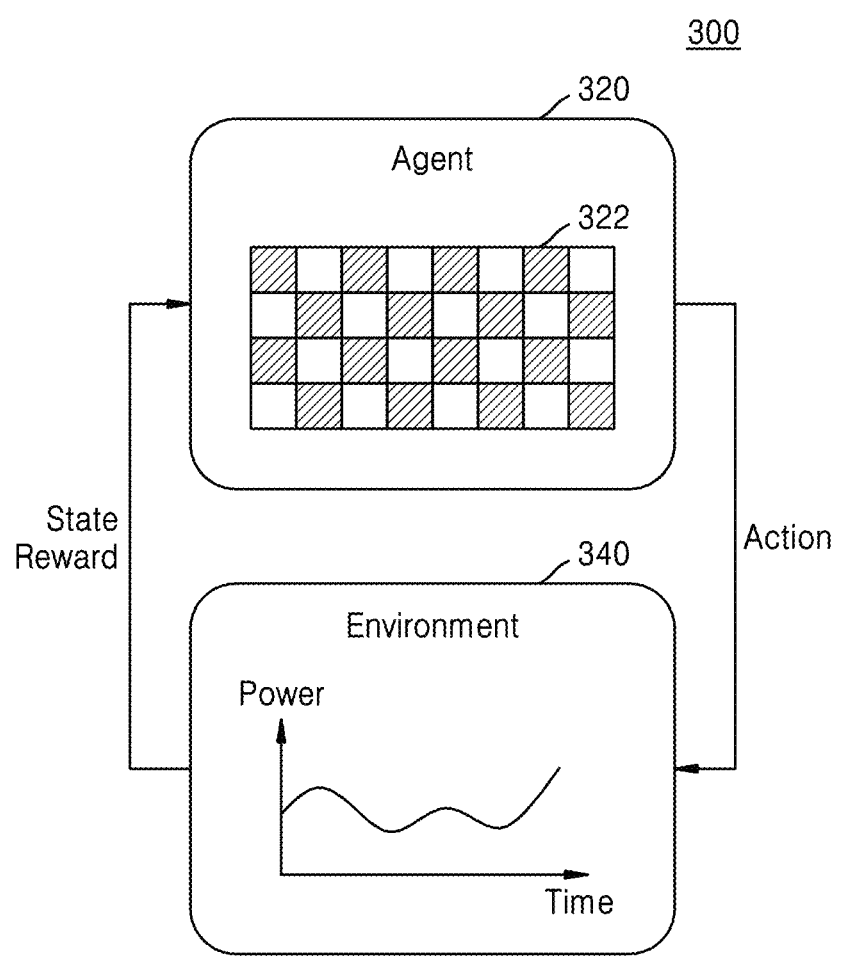
FIG. 3 is a diagram showing a reinforcement learning model according to some example embodiments.

FIG. 3 is a diagram showing a reinforcement learning model 300 according to some example embodiments. As described above with reference to FIG. 1, the reinforcement learning model 300 may be used to determine transmission power in wireless communication and may be implemented in the processing circuitry 160 of FIG. 1. As shown in FIG. 3, the reinforcement learning model 300 may include an agent 320 and an environment 340. Herein, the reinforcement learning model 300 may be referred to as a reinforcement learning platform, and the agent 320 and the environment 340 may be referred to as a reinforcement learning agent and a reinforcement learning environment, respectively. In some embodiments, the reinforcement learning model 300 (and/or the agent 320) may include organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM).

The agent 320 may receive a state and a reward from the environment 340 and may provide an action to the environment 340. The agent 320 may be trained to provide an action corresponding to the maximum reward in a state received from the environment 340. For example, the agent 320 may include a Q (quality)-table 322 and may be trained by updating the Q-table 322 based on a reward received from the environment 340. The Q-table 322 may include Q-values including immediate rewards and the maximum values of future rewards for combinations of states and actions, respectively. In some embodiments, as described below with reference to FIG. 8, the agent 320 may provide a randomly generated action to the environment 340. The environment 340 may receive an action from the agent 320 and provide a state and a reward to the agent 320. The environment 340 may change a state based on an action and/or may generate a reward based on a changed state.

In some embodiments, the environment 340 may generate a state and a reward based on the detected transmission power $P_{DET}$, the threshold transmission power $P_{THR}$, and/or a channel state. Also, the agent 320 may generate an action indicating the transmission power of a unit period based on a state provided from the environment 340 and the Q-table 322. Therefore, the agent 320 may be trained to determine the optimal transmission power considering both the SAR condition and communication quality in the equipment in which the reinforcement learning model 300 is implemented (e.g., in the UE 100 of FIG. 1). An example of the operations of the agent 320 and the environment 340 will be described below with reference to FIG. 4.

Figure 4:
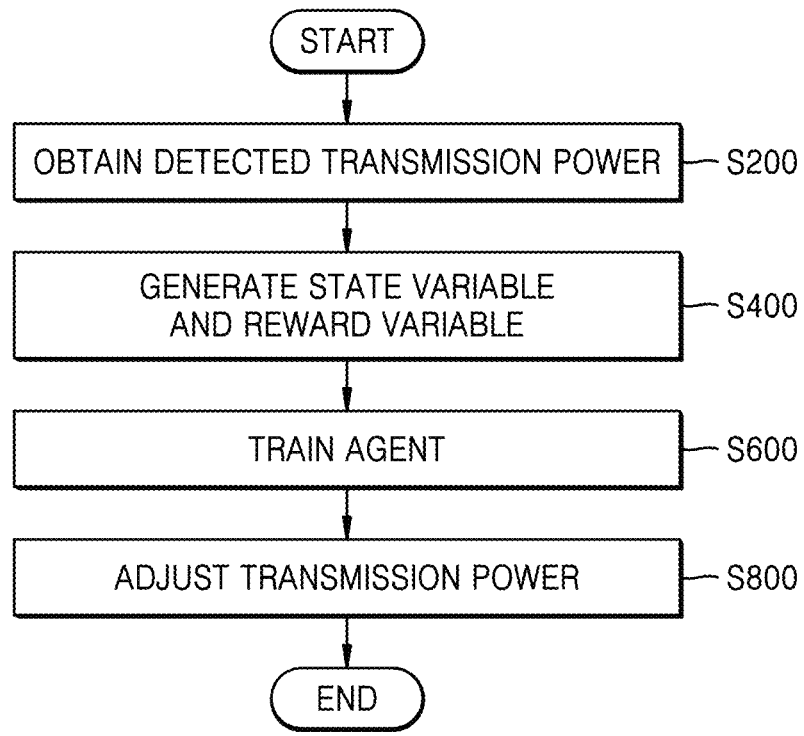
FIG. 4 is a flowchart of a method of controlling transmission power according to some example embodiments.

FIG. 4 is a flowchart of a method of controlling transmission power according to some example embodiments. As shown in FIG. 4, the method of controlling transmission power may include a plurality of operations S200, S400, S600, and S800. In some embodiments, the method of FIG. 4 may be performed by the processing circuitry 160 of FIG. 1. Hereinafter, FIG. 4 will be described with reference to FIG. 1, with the reinforcement learning model 162 of FIG. 1 including the agent 320 and the environment 340 of FIG. 3.

Referring to FIG. 4, the detected transmission power $P_{DET}$ may be obtained in operation S200. For example, the power detector 142 may generate the detection signal DET, e.g. by detecting transmission power, and the processing circuitry 160 may obtain and identify the detected transmission power based on the detection signal DET. The processing circuitry 160 may calculate the total transmission power output (e.g., during a unit period) based on the detected transmission power. Therefore, output transmission power $P_{OUT}$ output during a unit period U may be defined as shown in [Equation 2] below.

$$P_{OUT} = \int_0^U P_{DET} dt \qquad \text{[Equation 2]}$$

In operation S400, a state variable and a reward variable may be generated. For example, the environment 340 may generate a state variable and a reward variable based on the output transmission power $P_{OUT}$, the threshold transmission power $P_{THR}$, and/or a channel state. Examples of operation S400 will be described later with reference to FIGS. 5 and 6.

In operation S600, the agent 320 may be trained. For example, the agent 320 may be trained to generate an action variable representing transmission power based on the state variable and the reward variable generated in operation S400. In some embodiments, a range of transmission power may be set, and the agent 320 may be trained based on an action variable corresponding to the optimal transmission power within the set range as well as an environment variable and a reward variable corresponding to the action variable. In some embodiments, the agent 320 may generate an action variable for maximum reward (e.g., greedily) and/or may generate an action variable randomly. An example of the operation S600 will be described below with reference to FIG. 8. For example, the agent 320 may include decisions trees and/or rule learners that greedily use and/or process data based on a first-come, first served model.

In operation S800, the transmission power may be adjusted. For example, the processing circuitry 160 may identify a magnitude of transmission power corresponding to an action variable provided from the agent 320 trained in operation S600 and control the transceiver 140 based on the identified magnitude of transmission power, thereby adjusting the transmission power. For example, in some embodiments, the output power of a power amplifier included in the transceiver 140 may be adjusted, and thus, the transmission power may be adjusted accordingly.

Figure 5:
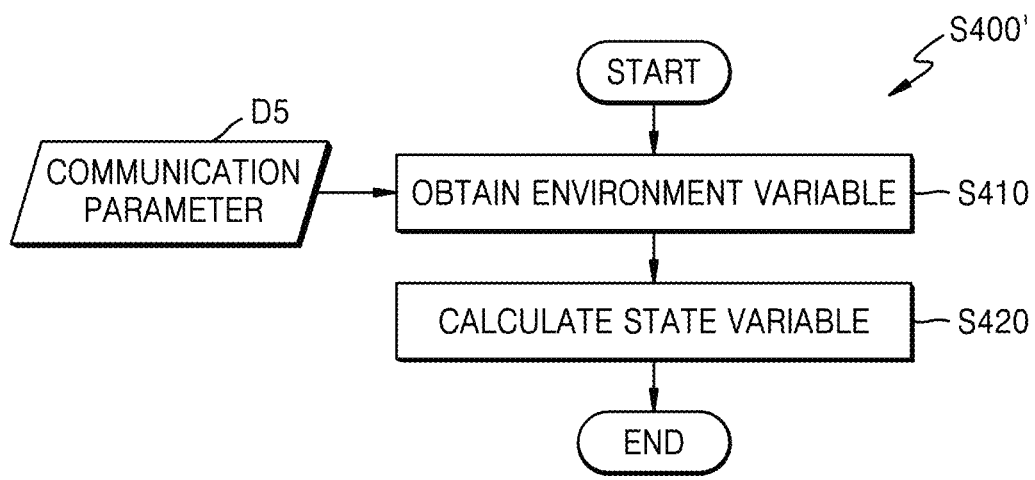
FIG. 5 is a flowchart of a method of controlling transmission power according to some example embodiments.

FIG. 5 is a flowchart of a method of controlling transmission power according to some example embodiments. The flowchart of FIG. 5 shows an example of operation S400 of FIG. 4. As described above with reference to FIG. 4, a state variable may be generated in operation S400' of FIG. 5. As shown in FIG. 5, operation S400' may include operation S410 and operation S420. In some embodiments, operation S400' may be performed in the environment 340 included in the reinforcement learning model 300 of FIG. 3. FIG. 5 will be described below with reference to FIG. 3.

Referring to FIG. 5, an environment variable may be obtained in operation S410. In some embodiments, to consider the communication quality as well as the SAR condition, the environment 340 may reflect a channel state to a state variable through the environment variable. For example, as shown in FIG. 5, an environment variable may be obtained based on a communication parameter D5. The communication parameter D5 may include, for example, a parameter indicating a state of a channel (e.g., a block error rate (BLER)) and/or channel state information (CSI). The environment 340 may include a table including values of the environment variable respectively corresponding to values of the communication parameter D5 and may obtain an environment variable corresponding to a value of the communication parameter D5 with reference to the table.

In operation S420, a state variable may be calculated. As described above with reference to FIG. 3, the state variable may be provided to the agent 320, and the agent 320 may generate an action variable based on the state variable. In some embodiments, when the environment variable obtained in operation S410 is θ, an environment variable $s_t$ may be calculated according to Equation 3 below.

$$s_t = \frac{P_{THR} - P_{OUT}}{P_{THR}} \times 100 + \theta \qquad \text{[Equation 3]}$$

The first term on the right side of [Equation 3] may correspond to the percentage of a difference (e.g., residual transmission power) between the threshold transmission power $P_{THR}$ and the output transmission power $P_{OUT}$ with respect to the threshold transmission power $P_{THR}$ and may be referred to herein as a transmission power residual rate. Accordingly, when the transmission power in a unit period is less than the threshold transmission power $P_{THR}$, the residual transmission power and the transmission power residual rate may be positive values. Meanwhile, when the transmission power exceeds the threshold transmission power $P_{THR}$ in the unit period, the residual transmission power and the transmission power residual rate may be negative values. As shown in [Equation 3], the state variable $s_t$ may correspond to the sum of the transmission power residual rate and an environment variable θ, and may be based on both the SAR condition and the channel state.

Figure 6:
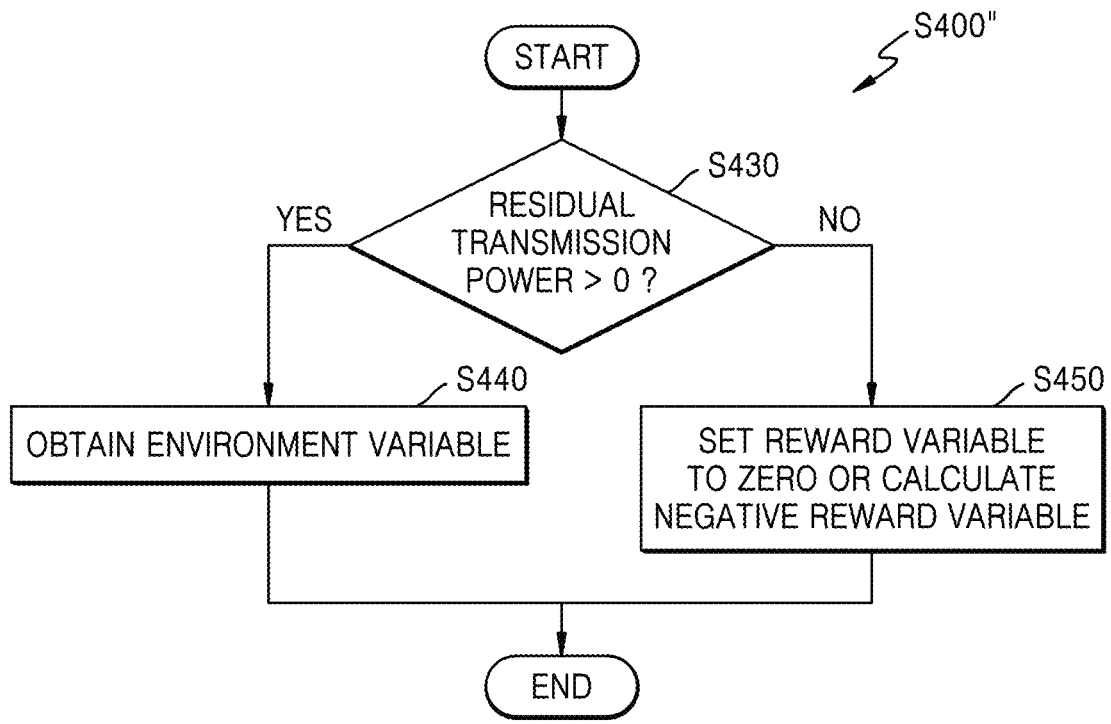
FIG. 6 is a flowchart of a method of controlling transmission power according to some example embodiments.

FIG. 6 is a flowchart of a method of controlling transmission power according to some example embodiments. The flowchart of FIG. 6 shows an example of operation S400 of FIG. 4. As described above with reference to FIG. 4, a reward variable may be generated in operation S400" of FIG. 6. As shown in FIG. 6, operation S400" may include a plurality of operations S430, S440, and S450. In some embodiments, operation S400" may be performed in the environment 340 included in the reinforcement learning model 300 of FIG. 3, and FIG. 6 will be described below with reference to FIG. 3.

Referring to FIG. 6, a sign of the residual transmission power may be determined in operation S430. As shown in FIG. 6, when the residual transmission power (e.g., $P_{THR} - P_{OUT}$) has a positive value, operation S440 may be subsequently performed. When the residual transmission power is zero or has a negative value, operation S450 may be subsequently performed.

When positive residual transmission power is determined, a positive reward variable may be calculated in operation S440. When positive residual transmission power is generated due to the transmission power determined by an action variable of the agent 320, the environment 340 may provide a positive reward to the agent 320. An example of operation S440 will be described below with reference to FIG. 7.

When zero or negative residual transmission power is determined, the reward variable may be set to zero and/or a negative reward variable may be calculated in operation S450. When zero residual transmission power and/or residual transmission power less than a predefined (and/or otherwise determined) positive reference value is generated due to the transmission power determined by the action variable of the agent 320 (e.g., when transmission is impossible due to a radio link failure (RLF) and/or the like), the environment 340 may provide zero reward and/or a negative reward to the agent 320. Therefore, the agent 320 may be trained to generate positive residual transmission power.

Figure 7:
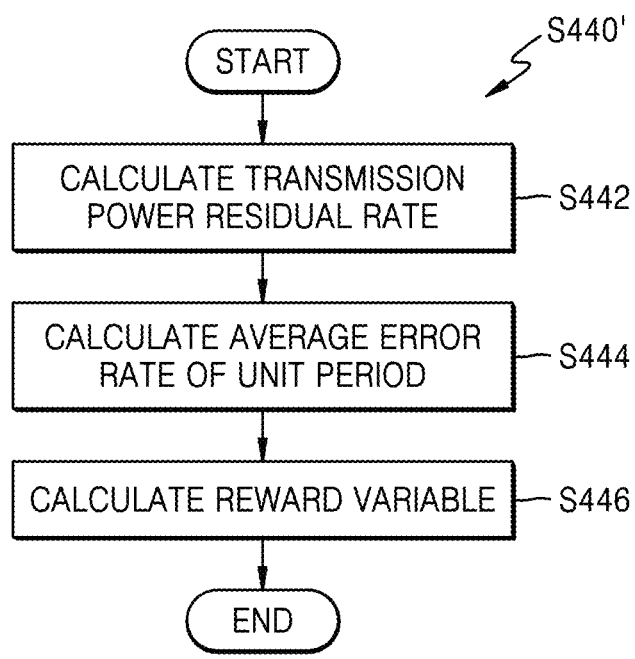
FIG. 7 is a flowchart of a method of controlling transmission power according to some example embodiments.

FIG. 7 is a flowchart of a method of controlling transmission power according to some example embodiments. The flowchart of FIG. 7 shows an example of operation S440 of FIG. 6. As described above with reference to FIG. 6, a positive reward variable may be generated in operation S440' of FIG. 7. As shown in FIG. 7, operation S440' may include a plurality of operations S442, S444, and S446. In some embodiments, operation S440' of FIG. 7 may be performed in the environment 340 included in the reinforcement learning model 300 of FIG. 3, and FIG. 7 will be described below with reference to FIG. 3.

Referring to FIG. 7, a transmission power residual rate may be calculated in operation S442. For example, as described above with reference to Equation 3, the environment 340 may calculate the transmission power residual rate as a percentage of the residual transmission power (e.g., $P_{THR}-P_{OUT}$) with respect to the threshold transmission power $P_{THR}$. As described below, the higher the transmission power residual rate is the higher the reward variable may be. Therefore, the agent 320 may receive a higher reward.

In operation S444, an average error rate of a unit period may be calculated. For example, the environment 340 may obtain error rates occurred in transmission during the unit period and may calculate an average of obtained error rates. In some embodiments, the environment 340 may calculate an average of block error rates (BLER) of a physical uplink shared channel (PUSCH) of a unit period. The average error rate of the unit period may represent a channel state, and, as described below, the reward variable may decrease as the average error rate of the unit period increases.

In operation S446, a reward variable may be calculated. For example, the environment 340 may calculate the reward variable $r_t$ based on [Equation 4] below.

$$r_t = (P_{THR}-P_{OUT})-C \times B_{AVG} \qquad \text{[Equation 4]}$$

In [Equation 4], $B_{AVG}$ may denote the average error rate of the unit period, and a correlation coefficient C may have a value, such that a positive reward variable $r_t$ is obtained. Therefore, the reward variable $r_t$ may increase as the margin of the transmission power increases and the channel state is better and may decrease as the margin of the transmission power decreases and the channel state is worse.

Figure 8:
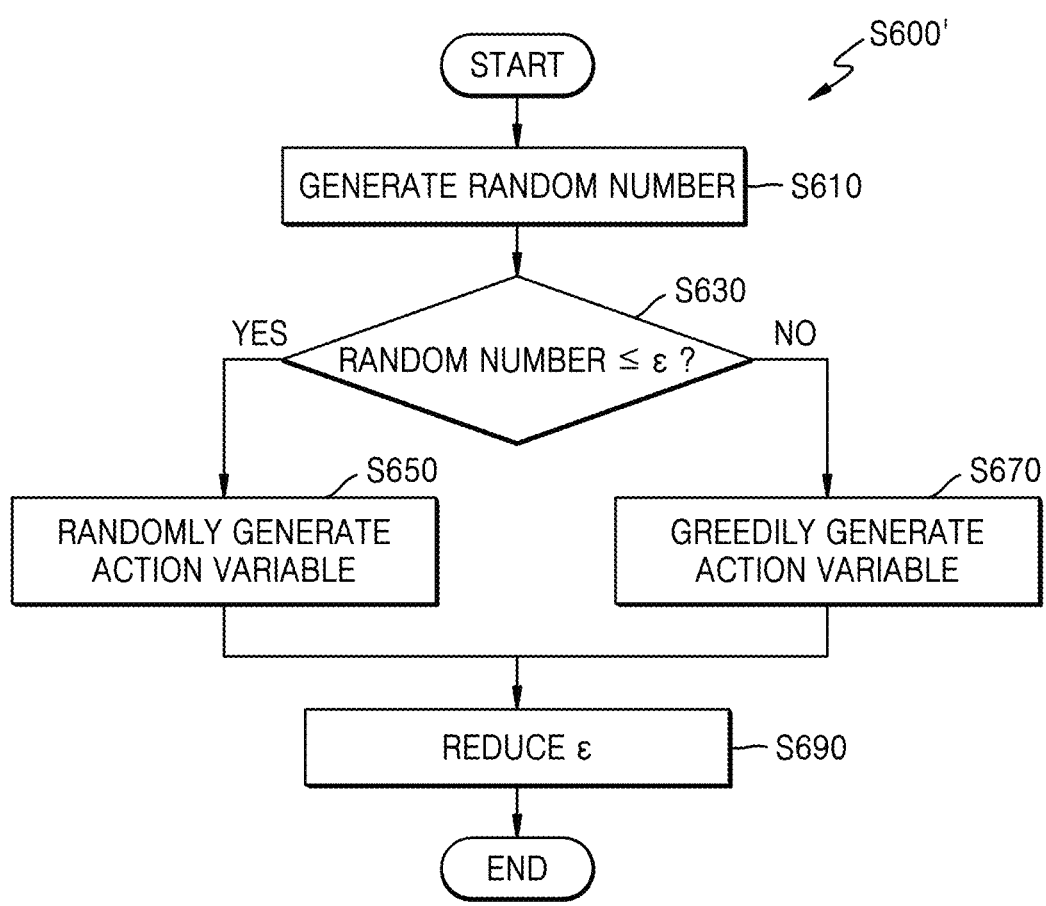
FIG. 8 is a flowchart of a method of controlling transmission power according to some example embodiments.

FIG. 8 is a flowchart of a method of controlling transmission power according to some example embodiments. The flowchart of FIG. 8 shows an example of operation S600 of FIG. 4. As described above with reference to FIG. 4, the agent may be trained in operation S600' of FIG. 8. As shown in FIG. 8, operation S600' may include a plurality of operations S610, S630, S650, S670, and S690. In some embodiments, operation S600' may be performed in the agent 320 included in the reinforcement learning model 300 of FIG. 3, and FIG. 8 will be described below with reference to FIGS. 1 and 3.

Referring to FIG. 8, a random number may be generated in operation S610. For example, the processing circuitry 160 may include a random number generator, and the random number generator may generate a random number within a certain range.

In operation S630, a random number may be compared with a reference value ε. The reference value ε may be included in the range of the random number generated in operation S610, and the probability that the random number exceeds the reference value ε may depend on the size of the reference value ε. For example, when a random number is generated in the range from 0 to 1 and the reference value ε is 0.5, the probability that the random number exceeds the reference value ε may be approximately 0.5. As shown in FIG. 8, when the random number is less than or equal to the reference value ε, operation S650 may be performed subsequently. Meanwhile, when the random number is greater than the reference value ε, operation S670 may be performed subsequently.

When the random number is less than or equal to the reference value ε, an action variable may be randomly generated in operation S650. When the agent 320 is repeatedly trained to generate an action variable corresponding to the highest reward variable (that is, greedy), the trained agent 320 may generate a locally optimal action variable. Therefore, the agent 320 may randomly generate an action variable with a particular probability, that is, the probability that the random number is less than or equal to the reference value ε. In some embodiments, the agent 320 may generate an action variable based on the random number generated in operation S610. Also, in some embodiments, the agent 320 may randomly generate an action variable within the range of transmission power to be described below with reference to FIG. 9.

When the random number is greater than the reference value ε, an action variable may be greedily generated in operation S670. For example, the agent 320 may be trained to receive an immediate reward and a maximum future reward and may update a Q-table based on [Equation 5] below.

$$Q_{t+1}(s_t, a_t) = \\ Q_t(s_t, a_t) + \beta \left\{ r_{t+1} + \rho \max_{a_{t+1}} Q_t(s_{t+1}, a_{t+1}) - Q_f(s_t, a_t) \right\} \qquad \text{[Equation 5]}$$

In [Equation 5], β is a learning rate and may have a value between 0 and 1 (0≤β≤1). When β=0, the agent 320 may not be trained. ρ is a discount factor and may have a value between 0 and 1 (e.g., 0≤ρ≤1). When ρ=0, future rewards may not be considered. The agent 320 may generate an action variable capable of maximizing a Q-value, e.g., as defined in [Equation 5]. Therefore, when the random number and the reference value ε are in the range from 0 to 1, an action variable may be randomly generated with a probability ε and may be greedily generated with a probability (1−ε). In this regard, the reinforcement learning model 300 may control the transmission power based on Q-learning. An example of operation S670 will be described below with reference to FIG. 9.

In operation S690, the reference value ε may be decreased. For example, the agent 320 may decrease the reference value ε by being repeatedly trained. Therefore, as learning progresses, the probability that the random number exceeds the reference value ε may decrease, and thus, the probability that an action variable is randomly generated may decrease. As a result, a rate at which the action variable is randomly generated may be high at the beginning of learning, whereas a rate at which the action variable is greedily generated may become high as the learning progresses. Accordingly, an action variable at may be defined as in [Equation 6] below.

$$a_t = \begin{cases} \text{random action} & R \leq \varepsilon \\ \underset{a \in A}{\text{argmax}} Q(s, a) & R > \varepsilon \end{cases} \quad \text{[Equation 6]}$$

In [Equation 6], R denotes a random number, and A denotes the range of transmission power as described below with reference to FIG. 10.

Figure 9:
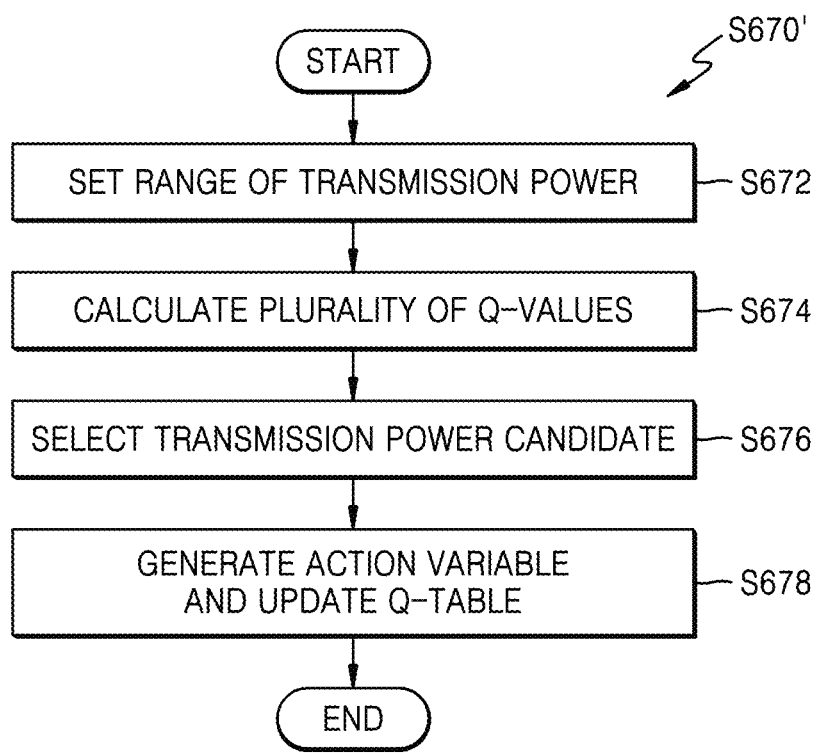
FIG. 9 is a flowchart of a method of controlling transmission power according to some example embodiments.

FIG. 9 is a flowchart of a method of controlling transmission power according to some example embodiments. The flowchart of FIG. 9 shows an example of operation S670 of FIG. 8. As described above with reference to FIG. 8, an action variable may be greedily generated in operation S670' of FIG. 9. As shown in FIG. 9, operation S670' may include a plurality of operations S672, S674, S676, and S678. In some embodiments, operation S670' may be performed in the agent 320 included in the reinforcement learning model 300 of FIG. 3, and FIG. 9 will be described below with reference to FIGS. 1 and 3.

Referring to FIG. 9, the range of transmission power may be set in operation S672. When transmission power is changed rapidly, communication quality may deteriorate or a radio link may be disconnected. Therefore, to prevent (and/or mitigate) a sudden change in transmission power by using an action variable generated by the agent 320, the range of transmission power may be set, and transmission power of a unit period may be determined within the range of transmission power. In some embodiments, the range of transmission power may depend on the transmission power of a previous unit period. For example, as described below with reference to FIG. 11, the range of transmission power may be defined by an upper limit and a lower limit calculated based on the transmission power of a previous unit period.

In operation S674, a plurality of Q-values may be calculated. For example, the agent 320 may calculate a plurality of Q-values respectively corresponding to a plurality of transmission power candidates included in the range of transmission power set in operation S672. Therefore, a plurality of Q-values respectively corresponding to a plurality of actions in the current state may be calculated.

In operation S676, a transmission power candidate may be selected. For example, the agent 320 may select one transmission power candidate from among the transmission power candidates included in the range of transmission power based on the Q-values calculated in operation S674. An example of operation S676 will be described below with reference to FIG. 11.

In operation S678, an action variable may be generated and the Q-table may be updated. For example, the agent 320 may generate an action variable corresponding to the transmission power candidate selected in operation S676, generate a Q-value based on the generated action variable, and reflect the generated Q-value to the Q-table.

Figure 10:
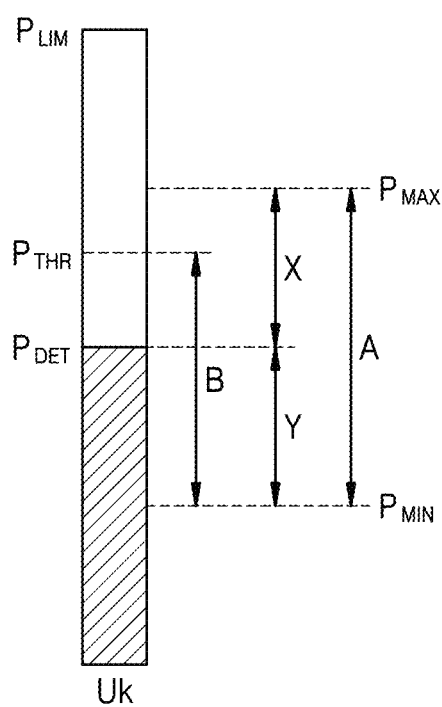
FIG. 10 is a diagram showing a range of transmission power according to some example embodiments.

FIG. 10 is a diagram showing a range of transmission power according to some example embodiments. As described above with reference to FIG. 9, the range of transmission power may be set, and transmission power may be determined within the range of transmission power.

In some embodiments, a range A of transmission power may be defined based on detected transmission power of a previous unit period. For example, as shown in FIG. 10, an upper limit $P_{MAX}$ of transmission power (e.g., that is higher by X than the detected transmission power $P_{DET}$ of a previous unit period Uk) may be calculated, and a lower limit $P_{MIN}$ of transmission power (e.g., that is lower by Y than the detected transmission power $P_{DET}$) may be calculated. The range A of transmission power of a current unit period Uk+1 may be defined by the upper limit $P_{MAX}$ of the transmission power and the lower limit $P_{MIN}$ of the transmission power. As described below with reference to FIG. 11, weights may be applied to transmission power candidates included in a range B between the lower limit $P_{MIN}$ of transmission power and the threshold transmission power $P_{THR}$ from the range A of transmission power.

Figure 11:
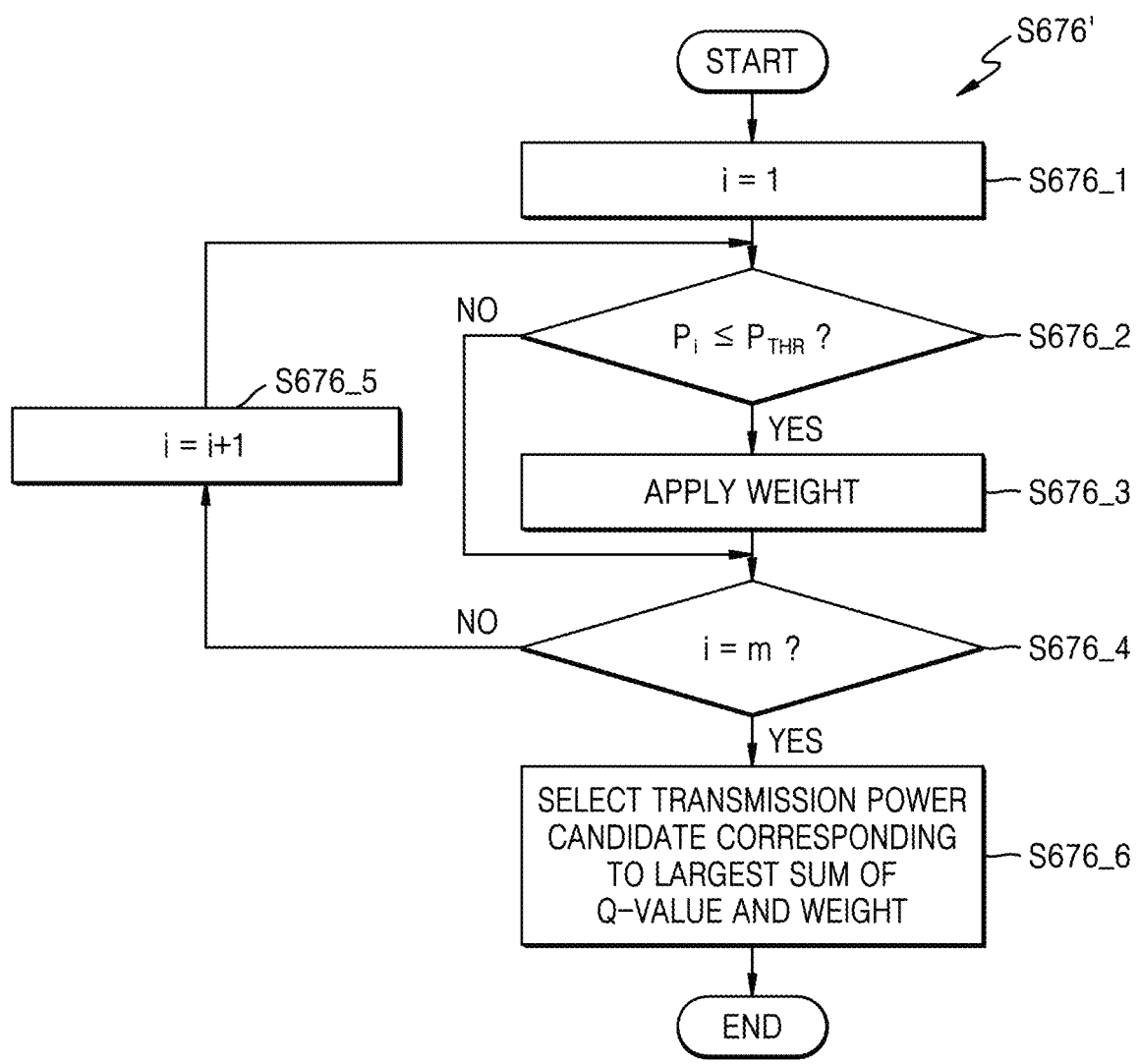
FIG. 11 is a flowchart of a method of controlling transmission power according to some example embodiments.

FIG. 11 is a flowchart of a method of controlling transmission power according to some example embodiments. The flowchart of FIG. 11 shows an example of operation S676 of FIG. 11. As described above with reference to FIG. 9, one transmission power candidate may be selected from among a plurality of transmission power candidates in operation S676' of FIG. 11. As shown in FIG. 11, operation S676' may include a plurality of operations S676_1 to S676_6. In some embodiments, operation S676' may be performed in the agent 320 included in the reinforcement learning model 300 of FIG. 3, and FIG. 11 will be described below with reference to FIGS. 1 and 3.

Referring to FIG. 11, a variable i may be set to 1 in operation S676_1. According to the range of the transmission power set in operation S672 of FIG. 9, m transmission power candidates may be available (wherein m represents an integer greater than 1). The variable i may correspond to the index of a transmission power candidate and may sequentially increase from 1 to m.

In operation S676_2, a transmission power candidate $P_i$ may be compared with the threshold transmission power $P_{THR}$. As shown in FIG. 11, when the transmission power candidate $P_i$ is equal to or less than the threshold transmission power $P_{THR}$, operation S676_3 may be subsequently performed. When the transmission power candidate $P_i$ exceeds the threshold transmission power $P_{THR}$, operation S676_4 may be performed subsequently.

When the transmission power candidate $P_i$ is equal to or less than the threshold transmission power $P_{THR}$, a weight may be applied in operation S676_3. For example, a weight may be applied to a transmission power candidate less than or equal to the threshold transmission power $P_{THR}$ from among a plurality of transmission power candidates included in the range of transmission power (e.g., a transmission power candidate included in the range B of FIG. 10), and the weight may be added to a Q-value corresponding to the transmission power candidate.

In operation S676_4, the variable i may be compared with the number m of transmission power candidates. As shown in FIG. 11, when the variable i is different from the number m of transmission power candidates, the variable i may be increased by 1 in operation S676_5, and operations S676_2, S676_3, and S676_4 may be performed again. On the other hand, when the variable i is equal to the number m of transmission power candidates, operation S676_6 may be subsequently performed.

In operation S676_6, the transmission power candidate having the largest sum of a Q-value and the weight may be selected. As described above, a Q-value may include an immediate reward and the maximum value of a future reward, and a weight may be selectively applied. A sum of a Q-value and a weight may be calculated for each of a plurality of transmission power candidates included in a range of transmission power, and a transmission power candidate corresponding to the largest sum from among the transmission power candidates may be selected.

Figure 12:
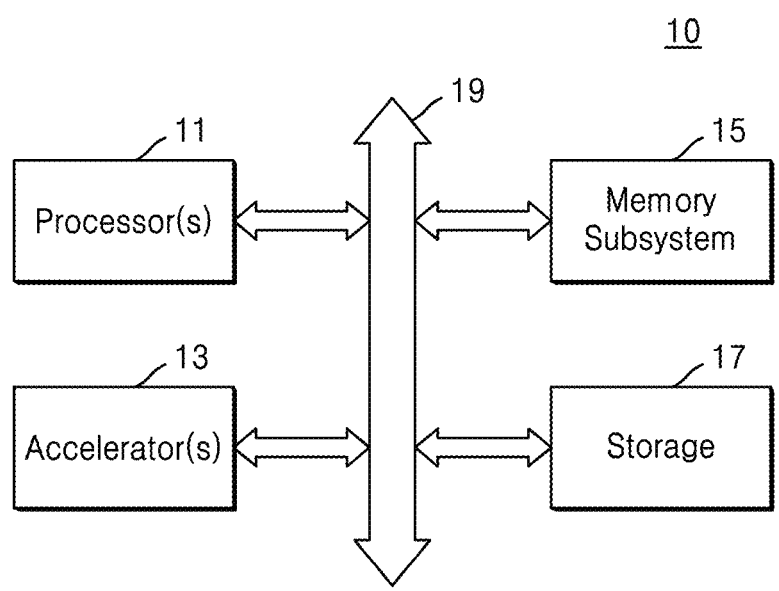
FIG. 12 is a diagram showing an example of processing circuitry according to some example embodiments.

FIG. 12 is a diagram showing an example of processing circuitry 10 according to some example embodiments. As described above with reference to the drawings, the processing circuitry 10 may implement a reinforcement learning model (e.g., 300 of FIG. 3) and use the reinforcement learning model to determine the optimal transmission power for an SAR condition and communication quality. As shown in FIG. 12, the processing circuitry 10 may include at least one processor 11, at least one accelerator 13, a memory sub-system 15, a storage 17, and a bus 19. The at least one processor 11, the at least one accelerator 13, the memory sub-system 15, and the storage 17 may communicate with one another through the bus 19. In some embodiments, the processing circuitry 10 may be manufactured through a semiconductor process, and, in some embodiments, at least two of the components of the processing circuitry 10 may be included in one package.

The at least one processor 11 may execute a series of instructions. For example, the at least one processor 11 may execute instructions stored in the memory sub-system 15 or the storage 17. Also, the at least one processor 11 may load instructions from the memory sub-system 15 and/or the storage 17 into an internal memory and execute loaded instructions. In some embodiments, the at least one processor 11 may perform at least some of the operations described above with reference to the drawings by executing instructions. In some embodiments, the at least one processor 11 may be and/or include the processing circuitry 160.

The at least one accelerator 13 may be designed to perform a predefined (and/or otherwise determined) operation at a high speed. For example, the at least one accelerator 13 may load data stored in the memory sub-system 15 and/or the storage 17, and store data generated by processing loaded data into the memory sub-system 15 and/or the storage 17. In some embodiments, the at least one accelerator 13 may perform at least some of the operations described above with reference to the drawings at a high speed. For example, the at least one accelerator 13 may be and/or include a machine learning (ML) (and/or artificial intelligence (AI)) accelerator.

The memory sub-system 15 may be a non-transitory storage device and may be accessed by the at least one processor 11 and/or the at least one accelerator 13 through the bus 19. In some embodiments, the memory sub-system 15 may include a volatile memory like dynamic random access memory (DRAM) and static random access memory (SRAM) and may also include a non-volatile memory like flash memory and resistive random access memory (RRAM). In some embodiments, the memory sub-system 15 may store instructions and data for performing at least some of the operations described above with reference to the drawings.

The storage 17 may be a non-transitory storage device and may be configured to not lose stored data even when power supply is cut off. For example, the storage 17 may include a semiconductor memory device like flash memory or any storage medium like a magnetic disk or an optical disc. In some embodiments, the storage 17 may store instructions, a program, and/or data for performing at least some of the operations described above with reference to the drawings.

While the inventive concepts have been particularly shown and described with reference to some example embodiments thereof, it will be understood that various changes in form and details may be made therein without departing from the spirit and scope of the following claims.

What is claimed is:

1. A method of controlling transmission power for wireless communication, the method comprising:
   obtaining detected transmission power;
   generating a state variable and a reward variable based on the detected transmission power, a threshold transmission power, and a channel state; and
   training a reinforced learning agent based on the state variable and the reward variable to output an action variable representing the transmission power,
   wherein the training of the reinforced learning agent comprises generating, by the reinforced learning agent, the action variable based on the state variable and the reward variable, and
   wherein the generating of the action variable comprises randomly generating the action variable with a probability $\varepsilon$, and greedily generating the action variable with a probability $(1-\varepsilon)$.

2. The method of claim 1, wherein the generating the state variable and the reward variable comprises:
   calculating a transmission power residual rate of a unit period based on the threshold transmission power and the detected transmission power.

3. The method of claim 2, wherein the generating of the state variable and the reward variable comprises:
   obtaining an environment variable based on at least one communication parameter indicating the channel state; and
   calculating the state variable based on the transmission power residual rate and the environment variable.

4. The method of claim 2, wherein the generating the state variable and the reward variable comprises:
   calculating the reward variable as a positive value based on the transmission power residual rate and the channel state when the transmission power residual rate is positive.

5. The method of claim 4, wherein the calculating of the reward variable comprises:
   calculating an average error rate during the unit period; and
   calculating the reward variable based on the transmission power residual rate and the average error rate.

6. The method of claim 1, wherein the training of the reinforced learning agent further comprises:
   gradually reducing the probability $\varepsilon$.

7. The method of claim 1, wherein the greedily generating of the action variable comprises:
   setting a range of transmission power based on a transmission power of a previous unit period;
   calculating a plurality of Q-values of Q-learning respectively corresponding to a plurality of transmission power candidates included in the range of transmission power;
   selecting one transmission power candidate from among the transmission power candidates based on the plurality of Q-values; and
   generating the action variable and updating a Q-table based on the selected transmission power candidate.

8. The method of claim 7, wherein the range of transmission power includes the transmission power of the previous unit period.

9. The method of claim 7, wherein the selecting the transmission power candidate comprises:
   applying a weight to at least one of the plurality of transmission power candidates, the weight equal to or less than the threshold transmission power; and
   selecting, as the selected transmission power candidate, a transmission power candidate corresponding to the largest sum of a weight and a Q-value from among the transmission power candidates.

10. The method of claim 1, wherein the threshold transmission power is defined based on a specific absorption rate (SAR).

11. The method of claim 1, further comprising:
adjusting the transmission power based on the action variable.

12. An apparatus comprising:
a memory configured to store instructions; and
at least one processor configured to communicate with the memory and, by executing the instructions, control transmission power for wireless communication,
wherein, to control the transmission power, the at least one processor is configured to
obtain detected transmission power;
generate a state variable and a reward variable based on the detected transmission power, a threshold transmission power, and a channel state; and
train a reinforced learning agent based on the state variable and the reward variable to output an action variable representing the transmission power,
wherein the at least one processor is configured to calculate a transmission power residual rate of a unit period based on the threshold transmission power and the detected transmission power to generate the state variable and the reward variable.

13. The apparatus of claim 12, wherein, to train the reinforced learning agent, the at least one processor is further configured to:
set a range of transmission power based on a transmission power of a previous unit period,
calculate a plurality of Q-values of Q-learning respectively corresponding to a plurality of transmission power candidates included in the range of transmission power,
select one transmission power candidate from among the transmission power candidates based on the plurality of Q-values, and
generate the action variable and update a Q-table based on the selected transmission power candidate.

14. A method of controlling transmission power for wireless communication, the method comprising:
obtaining detected transmission power; and
training a reinforced learning agent, based on the detected transmission power, a threshold transmission power, and a channel state, to output an action variable representing the transmission power,
wherein the training of the reinforced learning agent comprises
setting a range of transmission power based on a transmission power of a previous unit period;
calculating a plurality of Q-values of Q-learning respectively corresponding to a plurality of transmission power candidates included in the range of transmission power;
selecting one transmission power candidate from among the plurality of transmission power candidates based on the plurality of Q-values; and
generating the action variable and updating a Q-table based on the selected transmission power candidate.

15. The method of claim 14, wherein the range of transmission power comprises the transmission power of the previous unit period.

16. The method of claim 15, wherein the selecting of the transmission power candidate comprises:
applying weights to at least one of the plurality transmission power candidates, the weights equal to or less than the threshold transmission power; and
selecting, as the selected transmission power candidate, a transmission power candidate corresponding to the largest sum of a weight and a Q-value from among the transmission power candidates.

17. The method of claim 14, wherein the threshold transmission power is defined based on a specific absorption rate (SAR).

18. The method of claim 14, further comprising:
adjusting the transmission power based on the action variable.

* * * * *